United States Patent
Bang (10) Patent No.: US 10,052,952 B2
(45) Date of Patent: Aug. 21, 2018

(54) CONTROL METHOD FOR IMPROVING FUEL EFFICIENCY IN ADAPTIVE CRUISE CONTROL SYSTEM WHEN PRECEDING VEHICLE EXISTS

(71) Applicant: HYUNDAI MOTOR COMPANY, Seoul (KR)

(72) Inventor: Kyung Joo Bang, Seoul (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 15/368,023

(22) Filed: Dec. 2, 2016

(65) Prior Publication Data
US 2018/0001764 A1    Jan. 4, 2018

(30) Foreign Application Priority Data
Jul. 1, 2016 (KR) .................. 10-2016-0083493

(51) Int. Cl.
*B60K 31/00* (2006.01)
*B60W 30/16* (2012.01)

(52) U.S. Cl.
CPC ......... *B60K 31/0008* (2013.01); *B60W 30/16* (2013.01); *B60K 2031/0025* (2013.01); *B60K 2310/24* (2013.01); *B60K 2310/26* (2013.01)

(58) Field of Classification Search
CPC ............ B60K 31/0008; B60K 2310/24; B60K 2310/26; B60K 2310/244; B60K 2031/0025; B60W 30/16
See application file for complete search history.

(56) References Cited

U.S. PATENT DOCUMENTS

| 8,825,339 B2* | 9/2014 | Shono | B60K 6/445 701/22 |
| 8,868,312 B2* | 10/2014 | Pedlar | B60K 31/047 123/350 |

(Continued)

FOREIGN PATENT DOCUMENTS

| DE | 102008019174 A1 | 10/2009 |
| JP | H08-156643 A | 6/1996 |

(Continued)

OTHER PUBLICATIONS

Extended European Search Report issued in European Patent Application No. 17188689.8, dated Apr. 5, 2018.

*Primary Examiner* — Michael J Zanelli
(74) *Attorney, Agent, or Firm* — McDermott Will & Emery LLP (57) ABSTRACT

A control method for improving fuel efficiency in an adaptive cruise control system includes: setting a target velocity profile based on a current velocity and position when a vehicle is driven by the adaptive cruise control system; determining, by the controller, whether the preceding vehicle exists while driving by the target velocity profile; comparing, by the controller, a minimum distance for preventing a collision between the preceding vehicle and the following vehicle in a case of applying the target velocity profile with a first distance between the preceding vehicle and the following vehicle when the preceding vehicle exists; and performing, by the controller, fuel efficiency driving of the following vehicle when the minimum distance is larger than the first distance and performing driving of the following vehicle according to the target velocity profile when the minimum distance is smaller than the first distance.

8 Claims, 9 Drawing Sheets

(56) References Cited

U.S. PATENT DOCUMENTS

| | | | |
|---|---|---|---|
| 2004/0068359 A1 | 4/2004 | Neiss et al. | |
| 2015/0019117 A1 | 1/2015 | Huber et al. | |
| 2015/0307099 A1* | 10/2015 | Dextreit | B60W 50/085 |
| | | | 701/22 |
| 2016/0375905 A1 | 12/2016 | Park et al. | |

FOREIGN PATENT DOCUMENTS

| | | |
|---|---|---|
| JP | 2008-056162 A | 3/2008 |
| JP | 2013-067365 A | 4/2013 |
| JP | 5434711 B2 | 3/2014 |
| JP | 2014-240233 A | 12/2014 |
| JP | 2015-080977 A | 4/2015 |
| KR | 10-2011-0060244 A | 6/2011 |
| KR | 10-2012-0082602 A | 7/2012 |
| KR | 10-1315726 B1 | 10/2013 |
| WO | 2012/029178 A1 | 3/2012 |
| WO | 2013/102466 A1 | 7/2013 |

* cited by examiner

FIG. 1

-- PRIOR ART --

CONTROL METHOD FOR IMPROVING FUEL EFFICIENCY IN ADAPTIVE CRUISE CONTROL SYSTEM WHEN PRECEDING VEHICLE EXISTS

CROSS-REFERENCE TO RELATED APPLICATION

This application claims under 35 U.S.C. § 119(a) the benefit of priority to Korean Patent Application No. 10-2016-0083493 filed on Jul. 1, 2016, the entire content of which is incorporated herein by reference.

TECHNICAL FIELD

The present disclosure relates to a control method for improving fuel efficiency in an adaptive cruise control system when a preceding vehicle exists.

BACKGROUND

An adaptive cruise control (ACC) system is a system that enables a vehicle to be autonomously driven at a velocity set by a driver and maintains an appropriate inter-vehicle distance by measuring an inter-vehicle distance in real time through a laser sensor mounted in the front of a vehicle to assist safety driving of the vehicle by maintaining a safety distance from a preceding vehicle without a driver repeatedly operating an acceleration pedal and a brake pedal.

In recent years, the ACC system interlocks with a driving path setting system such as a navigation, and the like positioned in the vehicle, and as a result, the ACC system can set a target velocity profile for improving fuel efficiency by considering road information on a driving path.

The ACC system performs driving with the set target velocity profile when there is no preceding vehicle and when the preceding vehicle is discovered, the ACC system prevents a collision with the preceding vehicle by performing deceleration driving in order to maintain a predetermined distance from the vehicle.

As a related art, there is a cruise control system which can reduce fuel consumption while appropriately maintaining the safety distance between the vehicles and provides a technical characteristic that controls the vehicle according to the inter-vehicle distance by calculating a velocity variation by using a velocity profile.

Figure 1:
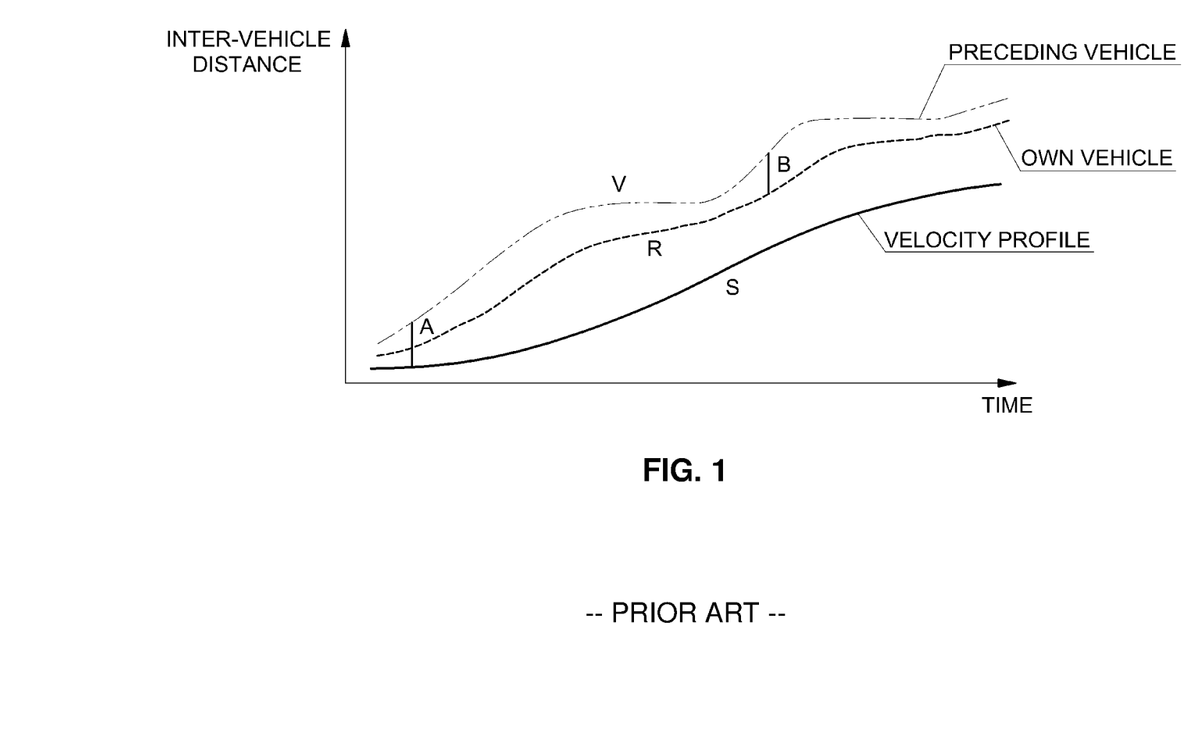
FIG. 1 illustrates an adaptive cruise control system adopting an inter-vehicle distance by calculating a velocity variation by using a velocity profile in the related art.

FIG. 1 illustrates an adaptive cruise control system adopting an inter-vehicle distance by calculating a velocity variation by using a velocity profile in the related art. Referring to FIG. 1, compared with a running curve V of a preceding vehicle, a velocity profile S is not the same type, but has a type that the velocity profile S may ensure fuel efficiency while following the preceding vehicle. When a distance between the preceding vehicle and an own vehicle is greater than a preset first reference distance A, variation in velocity is calculated using the velocity profile. The velocity profile follows the speed of the preceding vehicle to reduce the distance between the vehicles (A represents a reference distance between a velocity profile and a preceding vehicle, B represents a distance between the own vehicle and a preceding vehicle, S represents a running curve of the velocity profile, R represents a running curve of the own vehicle, and V represents a running curve of the preceding vehicle).

However, as described above, when the preceding vehicle is discovered and the vehicle decelerates through braking in order to maintain the inter-vehicle distance at a predetermined distance or more, driving different from a target velocity profile initially set to improve the fuel efficiency is performed and inflexible control in which acceleration or deceleration control is frequently performed cannot but be performed, and as a result, the fuel efficiency deteriorates.

As described above, in the related art, a control method is performed, which controls an engine output or braking force of the vehicle based on the velocity variation through the velocity profile of the vehicle, and as a result, a separate fuel efficiency driving profile depending on the changed velocity of the vehicle cannot be provided.

Further, as a method responding to various distance variations, a configuration of deceleration-controlling the velocity of the vehicle through braking is just provided, and as a result, it is impossible to respond to a request by a user for fuel efficiency driving.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with prior art and to provide a control method for improving fuel efficiency in an adaptive cruise control system when a preceding vehicle exists, which controls a current velocity of a vehicle and sets a new target velocity profile having optimal fuel efficiency based on a changed current velocity according to a preceding vehicle when the preceding vehicle exists.

The present disclosure has also been made in an effort to provide a control method for improving fuel efficiency in an adaptive cruise control system, which considers a current velocity of a vehicle, a velocity of a preceding vehicle, a lowest driving velocity and a deceleration distance set in the vehicle in calculating a target velocity profile when a preceding vehicle exists.

Objects of the present disclosure are not limited to the aforementioned object and other objects of the present disclosure, which are not mentioned, can be appreciated by the following description and will be more apparently know by the exemplary embodiment of the present disclosure. Further, the objects of the present disclosure can be implemented by means described in claims and combinations thereof.

A control method for improving fuel efficiency in an adaptive cruise control system when a preceding vehicle exists in order to achieve the object of the present disclosure includes the following components.

According to an exemplary embodiment of the present disclosure, a control method for improving fuel efficiency in an adaptive cruise control system when a preceding vehicle exists includes steps of: setting, by a controller, a target velocity profile based on a current velocity and position when a following vehicle is driven by the adaptive cruise control system; determining, by the controller, whether a preceding vehicle exists while driving by the target velocity profile; comparing, by the controller, a minimum distance for preventing a collision between the preceding vehicle and the following vehicle in the case of applying the target velocity profile and a first distance from the current preceding vehicle when the preceding vehicle exists; and performing fuel efficiency driving when the minimum distance is larger than the first distance and performing the driving according to the target velocity profile when the minimum distance is smaller than the first distance. The fuel efficiency driving is set by considering a first driving cost while maintaining the current velocity of the following vehicle in order to perform the fuel efficiency driving, a second driving cost in the case of applying a new target velocity profile when the minimum distance is secured after deceleration, the velocity of the preceding vehicle, the current velocity of the following vehicle, a lowest driving velocity set in the vehicle, a distance required to reach a current velocity of the preceding vehicle under the fuel efficiency driving, and a deceleration distance.

The step of performing the fuel efficiency driving may include: comparing the first driving cost with the second driving cost; maintaining, when the first driving cost is smaller than the second driving cost, the constant-velocity driving at the current velocity of the vehicle or performing the deceleration by comparing the current velocity of the vehicle and the velocity of the preceding vehicle; comparing, when the first driving cost is larger than the second driving cost, the current velocity of the following vehicle with a minimum velocity set in the vehicle; and performing, when the current velocity of the vehicle is larger than the minimum velocity set in the vehicle, driving through the auxiliary decelerator and performing, when the current velocity of the vehicle is smaller than the minimum velocity set in the vehicle, the driving at the minimum velocity set in the vehicle.

The step of comparing the current velocity of the vehicle and the velocity of the preceding vehicle may include: performing, when the current velocity of the vehicle is larger than the velocity of the preceding vehicle, the driving at the current velocity of the vehicle; and comparing, when the current velocity of the vehicle is smaller than the velocity of the preceding vehicle, a current distance between the vehicle and the preceding vehicle with a sum of a second distance, which is required to reach the velocity of the preceding vehicle under the fuel efficiency driving, and a first distance margin depending on the auxiliary deceleration means.

The comparing of the current distance with the sum of the second distance and the current distance margin may further include performing, when the current distance is larger than the sum of the second distance and the distance margin, the driving at the current velocity of the vehicle, and comparing, when the current distance is smaller than the sum of the second distance and the M1, the current distance with a sum of a third distance which is required to reach the current velocity of the preceding vehicle and a second distance margin through braking.

In the comparing of the current distance with the sum of the third distance and the second distance margin, when the current distance is larger than the sum of the third distance and the second distance margin, the deceleration may be performed through the auxiliary deceleration means of the vehicle and when the current distance is smaller than the sum of the third distance and the second distance margin, the deceleration may be performed through braking the vehicle.

In the setting of the target velocity profile, the target velocity profile may be set by considering road information on a driving path of the vehicle.

The road information may include a curvature, a gradient, and a rotational radius of a road.

According to the present disclosure, the following effect can be obtained by the present exemplary embodiment and a configuration, combination, and a use relationship to be described below.

The present disclosure provides an effect to improve fuel efficiency by following a new target velocity profile without a collision even when a preceding vehicle exists in performing adaptive cruise control.

Further, according to the present disclosure, since continuous deceleration cannot be artificially performed according to a distance from the preceding vehicle, there is an additional advantage in terms of fuel efficiency.

Moreover, the present disclosure provides an adaptive cruise control system which is configured to follow a new driving method depending on a current velocity of a vehicle to optimize driving cost when a distance to prevent the collision with the preceding vehicle is secured.

Other aspects and exemplary embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an exemplary embodiment of the present disclosure will be described in more detail with reference to the accompanying drawings. The exemplary embodiment of the present disclosure can be modified in various forms, and it should not be construed that the scope of the present disclosure is limited to exemplary embodiments described below in detail. The exemplary embodiments are provided to more completely describe the present invention to those skilled in the art. Therefore, shapes of elements in the drawings are exaggerated in order to emphasize more clear description.

In describing the exemplary embodiment of the present disclosure, detailed description of known function or constitutions will be omitted if they make the gist of the present invention unclear. In addition, terms as terms which are specially defined in consideration of functions in the exemplary embodiment of the present disclosure may vary depending on the intention or usual practice of a user or an operator. Accordingly, the terms need to be defined base on contents throughout this specification.

Further, throughout the specification, unless explicitly described to the contrary, the word "comprise" and variations such as "comprises" or "comprising" will be understood to imply the inclusion of stated elements but not the exclusion of any other elements.

Moreover, a case in which abbreviations of the present disclosure as terms defined in the specification include orders such as "1", "2", and the like means a case in which a change of a viewpoint according to individual exemplary embodiments of the present disclosure or the terms have values different from the existing values in the same exemplary embodiment, and therefore, the case means that the terms have values which are not limited and are irrelevant to the orders.

Figure 2:
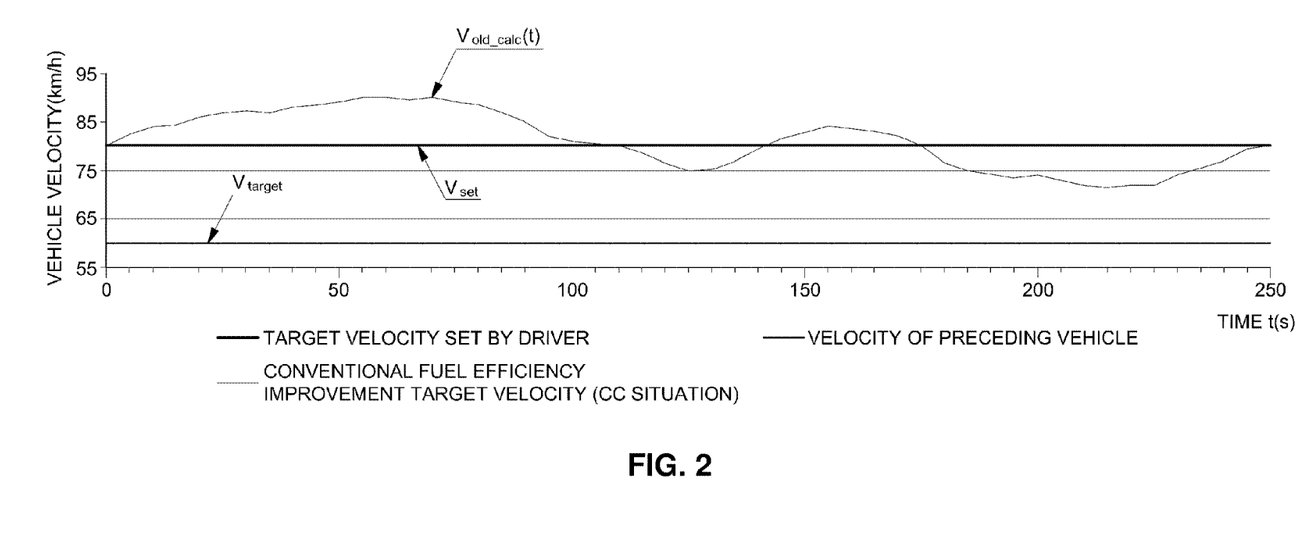
FIG. 2 illustrates a relationship between a target velocity profile of a driving vehicle and a velocity of a preceding vehicle according to an exemplary embodiment of the present disclosure.

FIG. 2 illustrates a target velocity profile and a velocity of a preceding vehicle depending on a target velocity of a driver according to an exemplary embodiment of the present disclosure.

Referring to FIG. 2, a fuel efficiency improvement target velocity profile is calculated, by a controller such as an electronic control unit (ECU), by integrating path information input in a vehicle based on a target velocity Vset set by the driver. More specifically, the controller of the vehicle collects the path information through navigation and collects road information data depending on path through map information stored in the controller of the vehicle, and as a result, the target velocity profile is set by using information such as a curvature, a gradient, and a rotational radius of a road.

However, as described above, even when driving is performed according to an initially set target velocity profile, in the case where a preceding vehicle maintaining a predetermined velocity exists, a relationship between a safety inter-vehicle distance which may be previously set in an adaptive cruise control system and an actual inter-vehicle distance between a corresponding vehicle and the preceding vehicle may be problematic. That is, when the target velocity profile of the corresponding vehicle is expressed as Vold_calc(t) and a velocity of the preceding vehicle is set as Vtarget, the distance between the corresponding vehicle and the preceding vehicle, Dstart is calculated as below.

$$D\text{start} \leq \int (V_{old\text{-}calc}(t) - V_{target}) dt$$

The corresponding vehicle will collide with the preceding vehicle under conditions according to the above equation.

As described above, when the preceding vehicle exists, the distance Dstart is configured to have a Ds value or more which is a distance for preventing the collision. That is, the Ds means a minimum distance (safety inter-vehicle distance) in which the corresponding vehicle does not collide with the preceding vehicle in spite of following a current target velocity profile and is calculated through an equation given below.

$$Ds = D\min + |\min(\Delta d)|$$

(Dmin: minimum distance allowable in adaptive cruise control system)

Δd as a relative distance variation between the corresponding vehicle and the preceding vehicle is calculated by integrating a difference between the Vtarget value, which is the velocity of the preceding vehicle, and a newly set target velocity profile Vnew_cal_0(t).

$$\Delta d = \int (V\text{target} - V\text{new-calc-0}(t)) dt$$

As described above, Δd becomes a maximum distance narrowed by a difference between the velocity of the corresponding vehicle and the velocity of the preceding vehicle.

Therefore, when Dc, which is an inter-vehicle distance between the current preceding vehicle and the following vehicle, is smaller than Ds, a velocity variation is required to include an artificial deceleration section for securing Ds in the case of the corresponding vehicle.

Figure 3:
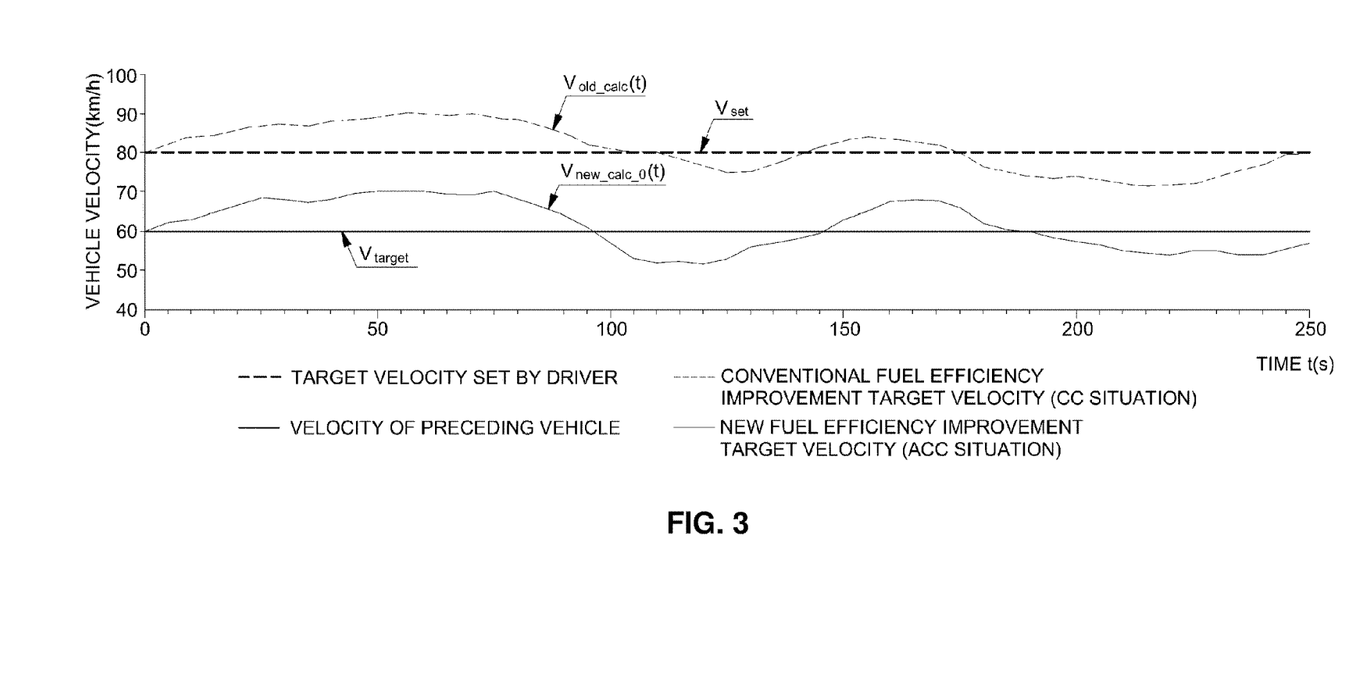
FIG. 3 illustrates a graph of setting a new target velocity profile by considering the velocity of the preceding vehicle according to an exemplary embodiment of the present disclosure.

FIG. 3 illustrates a graph of setting a new fuel efficiency improvement target velocity profile according to a vehicle velocity of a preceding vehicle.

As illustrated in FIG. 3, the controller may set a new target velocity profile for the velocity of the preceding vehicle, and therefore, the controller may control the vehicle so as to perform the driving according to Vnew_calc_0(t). That is, when the preceding vehicle exists, the new fuel efficiency improvement target velocity profile is set, and therefore, the controller performs control for preventing the collision with the preceding vehicle.

However, as described above, even when the new target velocity profile is set for the velocity of the preceding vehicle, it needs to be determined whether the safety inter-vehicle distance previously set in the adaptive cruise control system may be maintained.

Figure 4:
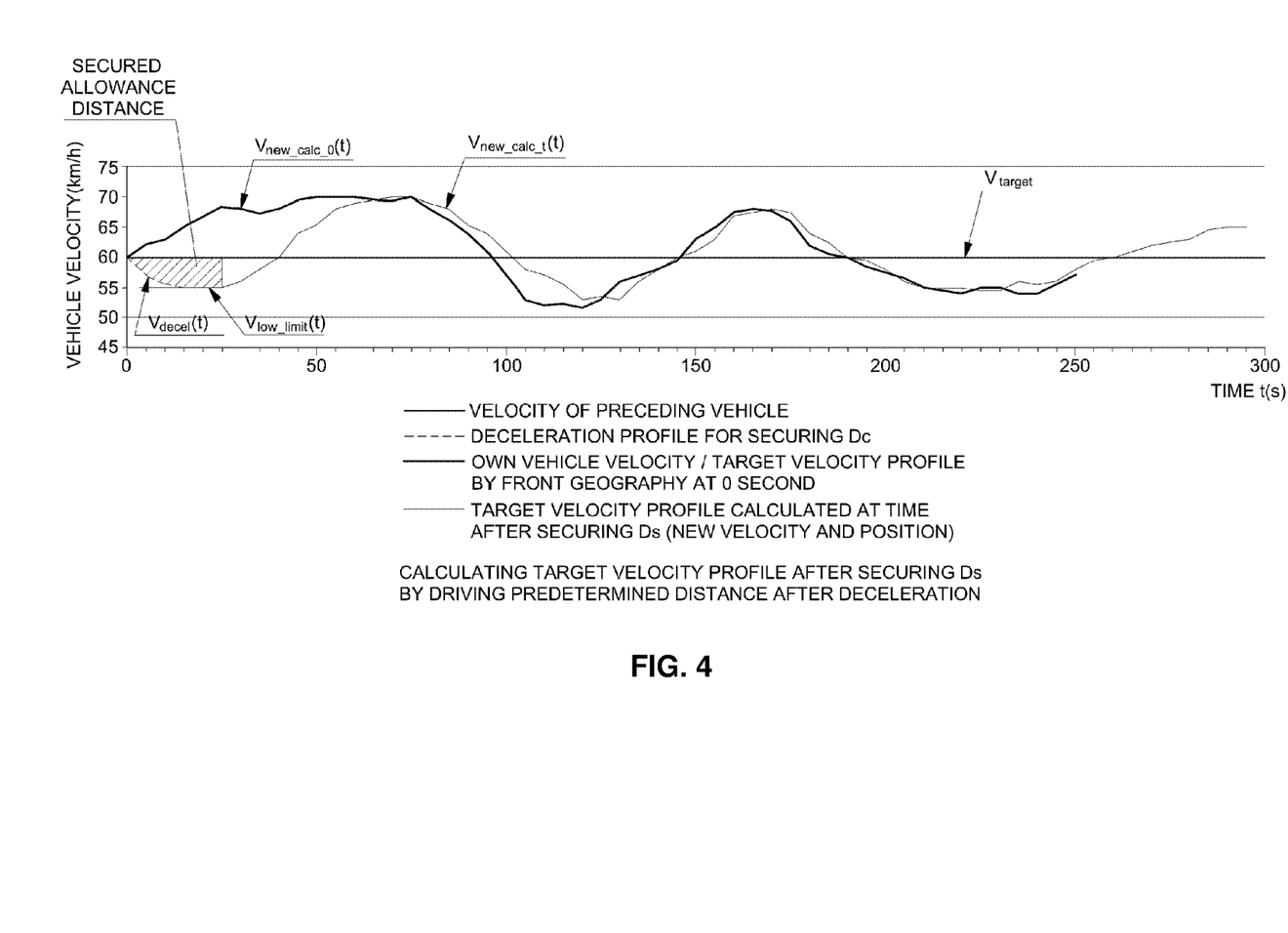
FIG. 4 illustrates a velocity graph of setting the new target velocity profile by securing a safety distance depending on the velocity of the preceding vehicle according to an exemplary embodiment of the present disclosure.

FIG. 4 illustrates a vehicle velocity graph of setting the new target velocity profile after performing deceleration in order to maintain the safety inter-vehicle distance according to an exemplary embodiment of the present disclosure.

As illustrated in FIG. 4, when the driving is performed by following Vnew_calc_0(t) initially calculated as the new profile, the safety inter-vehicle distance may not be maintained and additional deceleration needs to be performed, and as a result, a velocity value of the deceleration section has Vdecel(t).

According to a deceleration method, a scheme that calculates the Vdecel(t) value may vary, but as an exemplary embodiment of the present disclosure, when an acceleration generated by performing an auxiliary deceleration means (a fuel cut, and the like) is applied to calculate the Vdecel(t) value for each time, the Vdecel(t) may be calculated as below.

$$V\text{decel}(t) = \int a_{Fuelcut} dt + V_{current}$$

The $a_{Fuelcut}$ represents a vehicular acceleration force when the auxiliary deceleration means (the fuel cut, and the like) is performed. As a value applied as the acceleration, the acceleration of the auxiliary deceleration means such as the acceleration through an auxiliary brake, the acceleration through Eco-roll, and the acceleration through the fuel cut may be applied.

The auxiliary deceleration means as a means which may decelerate the vehicle except for a main brake (friction brake) includes the fuel cut, an engine brake, the auxiliary brake (a retarder, an exhaust brake, and the like), the Eco-roll (a gear neutral position), and the like and includes all means which may decelerate while improving the fuel efficiency compared with a case of using the main brake.

However, when the calculated Vdecel(t) is smaller than a Vlow_limit value previously set in the adaptive cruise control system, the Vdecel(t) value is set to have Vlow_limit.

Further, cost of following the new target velocity profile and cost of maintaining the current velocity after securing an artificial allowance distance including the deceleration section are calculated to set driving having the lower cost to be maintained. That is, driving cost means cost calculated by considering all economic consumption factors including fuel efficiency consumption, and the like when the vehicle is driven according to the set profile or velocity.

That is, the driving cost in the case of performing the driving by maintaining the decelerated current velocity is calculated as Cc and the driving cost in the case of following the new target velocity profile is calculated as Ccontrol to compare both costs. As described above, after the artificial deceleration section is performed, when it is determined that the cost of Ccontrol in the case of following the new target velocity profile set based on the current velocity of the vehicle after deceleration is smaller than the Cc, the Vlow_limit value previously set in the adaptive cruise control system and the current velocity Vc are additionally compared with each other. Therefore, when the current velocity Vc is larger than Vlow_limit, a distance of Ds or more is secured by performing the auxiliary deceleration means (the fuel cut, and the like) and when the current velocity Vc is smaller than Vlow_limit, the driving is configured to be maintained according to the Vlow_limit value.

On the other hand, when it is determined that the cost of Cc is smaller than the cost of Ccontrol, the current velocity of the vehicle and the velocity Vtarget of the preceding vehicle are compared with each other, and therefore, the driving of the vehicle is set by considering Dcruise which is a distance required to reach the Vtarget value which is the velocity of the preceding vehicle without canceling the fuel efficiency improvement adaptive cruise control system through the velocity of the preceding vehicle, the current velocity of the vehicle, a lowest driving velocity set in the vehicle, and the auxiliary deceleration means (the fuel cut, and the like), Dbrake which is a distance required to reach the Vtarget value by performing braking, and distance margins M1 and M2 depending on the deceleration method.

When the current velocity of the vehicle is smaller than the velocity of the preceding vehicle, the current velocity is set to be maintained and when the current velocity of the vehicle is larger than the velocity of the preceding vehicle, and a distance from the current preceding vehicle is compared with a value acquired by aggregating the distance required to reach the Vtarget value which is the velocity of the preceding vehicle without canceling the fuel efficiency improvement adaptive cruise control system through the auxiliary deceleration means (the fuel cut, and the like) and the distance margin M1 depending on the deceleration method.

Further, when the value acquired by aggregating the distance required to reach the Vtarget value which is the velocity of the preceding vehicle without canceling the fuel efficiency improvement adaptive cruise control system through the auxiliary deceleration means (the fuel cut, and the like) and the distance margin M1 depending on the deceleration method is larger than the distance from the current preceding vehicle, the distance from the current preceding vehicle is compared with a value acquired by aggregating Dbrake which is the distance required to reach the Vtarget value by performing braking and the distance margin M2 depending on the deceleration method.

Since Dbrake of the present disclosure means the distance required to reach the Vtarget value which is the velocity of the preceding vehicle without canceling the fuel efficiency improvement adaptive cruise control system by performing braking by using a braking device, the Dbrake means a value including Dmin on the adaptive cruise control system.

That is, Dbrake may be defined as a sum of Dx which is the distance required to reach the Vtarget value by performing braking and Dmin. Dx means a distance that continuously has a smaller value than the distance required to reach the Vtarget value by performing the auxiliary deceleration means (the fuel cut, and the like) and is required while braking within a braking force range allowed by the adaptive cruise control system.

Figure 5:
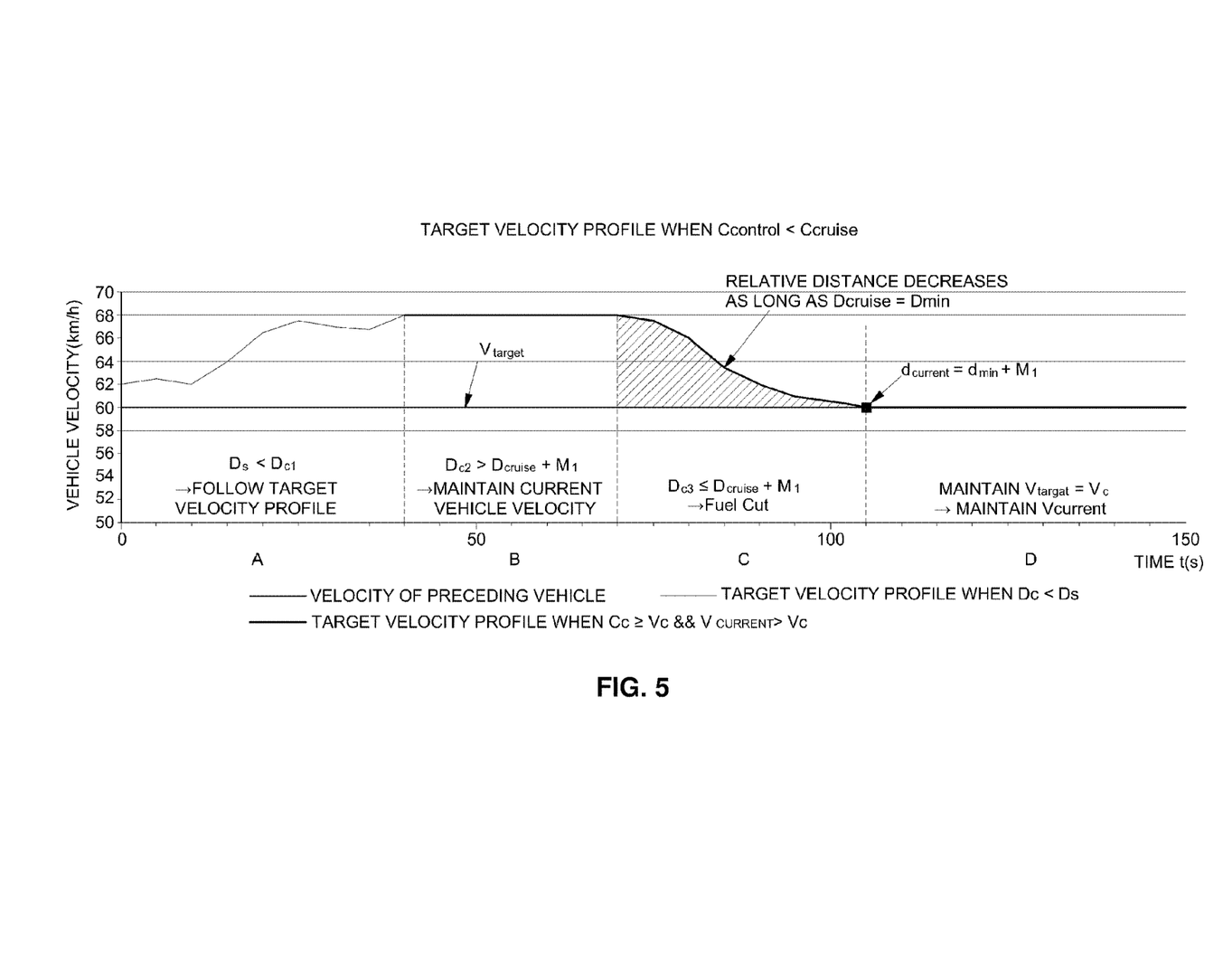
FIG. 5 illustrates an optimal fuel efficiency velocity following graph of a vehicle depending on new target velocity profile cost and cost depending on maintaining a current velocity of the vehicle according to an exemplary embodiment of the present disclosure.

FIG. 5 illustrates a driving velocity of a vehicle depending on an inter-vehicle distance, cost of Cc, and cost of Ccontrol according to an exemplary embodiment of the present disclosure.

As illustrated in FIG. 5, in section A, as a case in which Ds as the safety inter-vehicle distance at which the corresponding vehicle does not collide with the preceding vehicle in spite of following the current target velocity profile is smaller than Dc1 which is the current inter-vehicle distance, the driving is performed according to the set target velocity profile.

In contrast, in section B as a case in which Dc2 which is the current inter-vehicle distance is larger than the value acquired by aggregating Dcruise which is the distance required to reach the Vtarget value which is the velocity of the preceding vehicle without canceling the fuel efficiency improvement adaptive cruise control system through the auxiliary deceleration means (the fuel cut, and the like) and the distance margin M1 depending on the auxiliary deceleration means (the fuel cut, and the like), the driving to maintain the current vehicle velocity is performed.

Herein, M1 as a predetermined value set by the user according to an error at the time of measuring the distance from the preceding vehicle and a velocity control error of the adaptive cruise control system may be set to a value of 0 or more. More preferably, M1 may be configured to include a predetermined value set by a manufacturer of the vehicle while releasing.

Dcruise means the distance required to reach the Vtarget value which is the velocity of the preceding vehicle without canceling the fuel efficiency improvement adaptive cruise control system through the auxiliary deceleration means (the fuel cut, and the like), and is calculated as below.

$$D\text{cruise} = \int_0^t V\text{decel}(\tau)d\tau + D\text{min}$$

(Dmin: minimum distance allowable in adaptive cruise control system)

Thereafter, in section C as a case in which Dc3 which is the current inter-vehicle distance is smaller than the value acquired by aggregating Dcruise which is the distance required to reach the Vtarget value which is the velocity of the preceding vehicle without canceling the fuel efficiency improvement adaptive cruise control system through the auxiliary deceleration means (the fuel cut, and the like) and the distance margin M1 depending on the auxiliary deceleration means (the fuel cut, and the like), a configuration to perform the auxiliary deceleration means (the fuel cut, and the like) is disclosed. Thereafter, in section D, the driving is performed so as to maintain the current inter-vehicle distance and have the same velocity as the Vtarget.

As disclosed above, predetermined numbers are applied to Dc1, Dc2, and Dc3 in order to express the current inter-vehicle distance at different determination times and consecutive distance determination is performed at the respective times.

Figure 6:
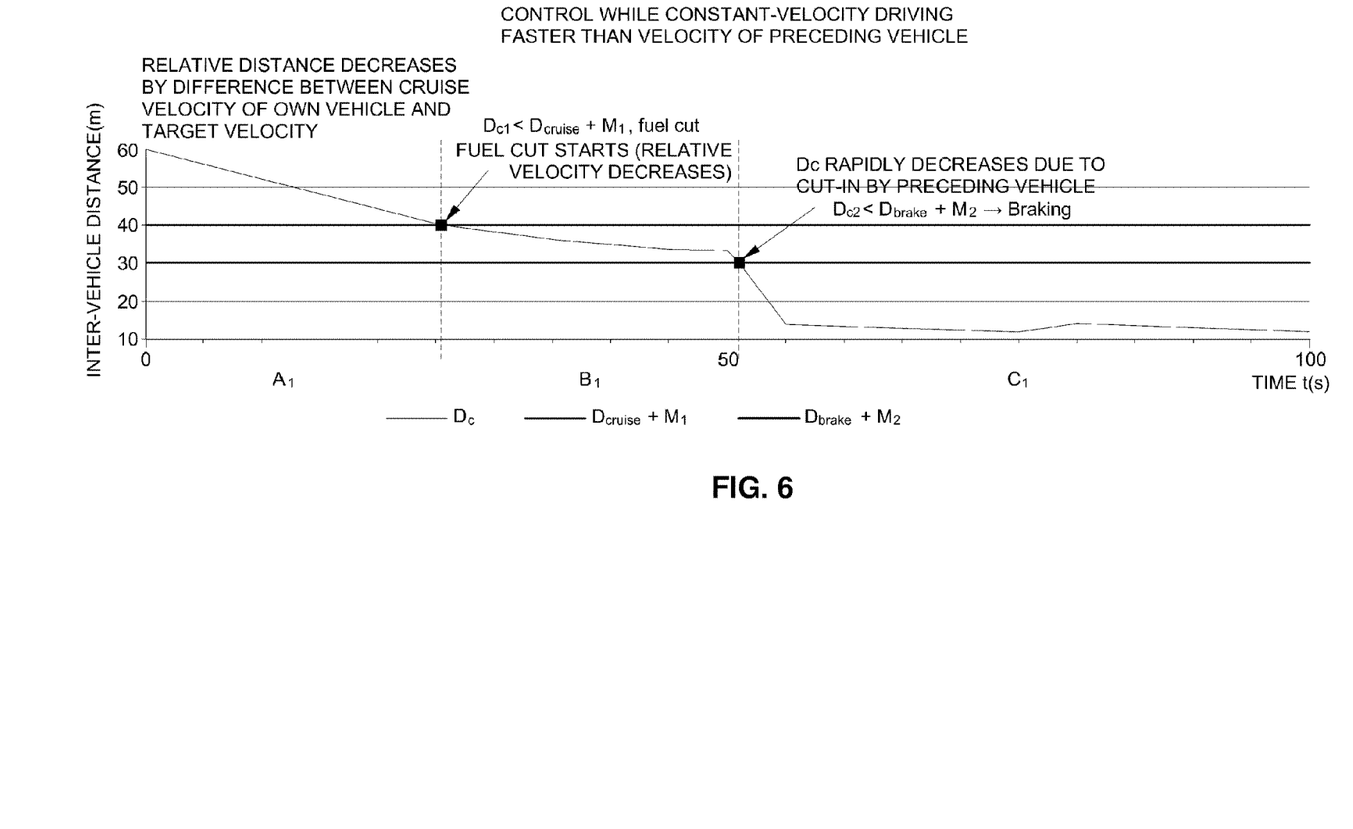
FIG. 6 illustrates a variation value of an inter-vehicle distance between the preceding vehicle and a driving vehicle with time according to an exemplary embodiment of the present disclosure.

FIG. 6 illustrates a variation of an inter-vehicle distance by comparing a velocity of a preceding vehicle and a current velocity of a current vehicle which is driven at a constant velocity according to an exemplary embodiment of the present disclosure.

In performing the fuel efficiency driving, a case of performing the driving while maintaining the current velocity is illustrated in section A1. That is, section A1 shows a section in which the inter-vehicle distance from the preceding vehicle is reduced as the vehicle is driven constantly at the current velocity.

In section B1, a section is illustrated, in which when the inter-vehicle distance continuously decreases and thus, Dc1 which is the current inter-vehicle distance is smaller than the sum of Dcruise through the auxiliary deceleration means (the fuel cut, and the like) and the distance margin M1 depending on the auxiliary deceleration means (the fuel cut, and the like) and larger than the sum of Dbrake and the distance margin M2 depending on braking, the auxiliary deceleration means (the fuel cut, and the like) starts and a relatively velocity thus decreases.

Here, M2 is a value set by considering the deceleration to provide comfortable braking force to the driver when performing braking, and may be arbitrarily set by the user or at the time of releasing the vehicle by considering the velocity error of the vehicle and the braking force set in the adaptive cruise control system.

M2 may be set by considering a deceleration value in which the driver may feel smooth braking and the deceleration of the smooth braking may be set in a range to maintain the adaptive cruise driving system.

The distance margin M2 depending on the braking may have a smaller value than the distance margin M1 depending on the auxiliary deceleration means (the fuel cut, and the like) and may have a negative value.

Moreover, a Dbrake+M2 value continuously needs to be set to have a smaller value than a Dcruise+M1 value, and therefore, the sum of the deceleration distance to perform braking and the distance margin M2 needs to have a smaller value than the sum of the deceleration distance through the fuel cut and the distance margin M1.

Moreover, rapid braking is required in section C1, and therefore, control is performed depending on cut-in of the preceding vehicle or velocity deceleration of the preceding vehicle, and as a result, section C1 as a section in which the current inter-vehicle distance Dc2 is smaller than the sum of Dbrake and the distance margin M2 depending on the braking, a configuration to perform braking of the corresponding vehicle is disclosed.

As described above, sections B1 and C1 of the graph illustrated in FIG. 6 are a configuration to control driving of the corresponding vehicle by comparing the sum of the distance margin and the distance required to reach the Vtarget value which is the velocity of the preceding vehicle without canceling the fuel efficiency improvement adaptive cruise control system through the auxiliary deceleration means (the fuel cut, and the like) with the current inter-vehicle distance at the time of determination under a condition of the corresponding condition which performs constant-velocity driving faster than the preceding vehicle.

Figure 7:
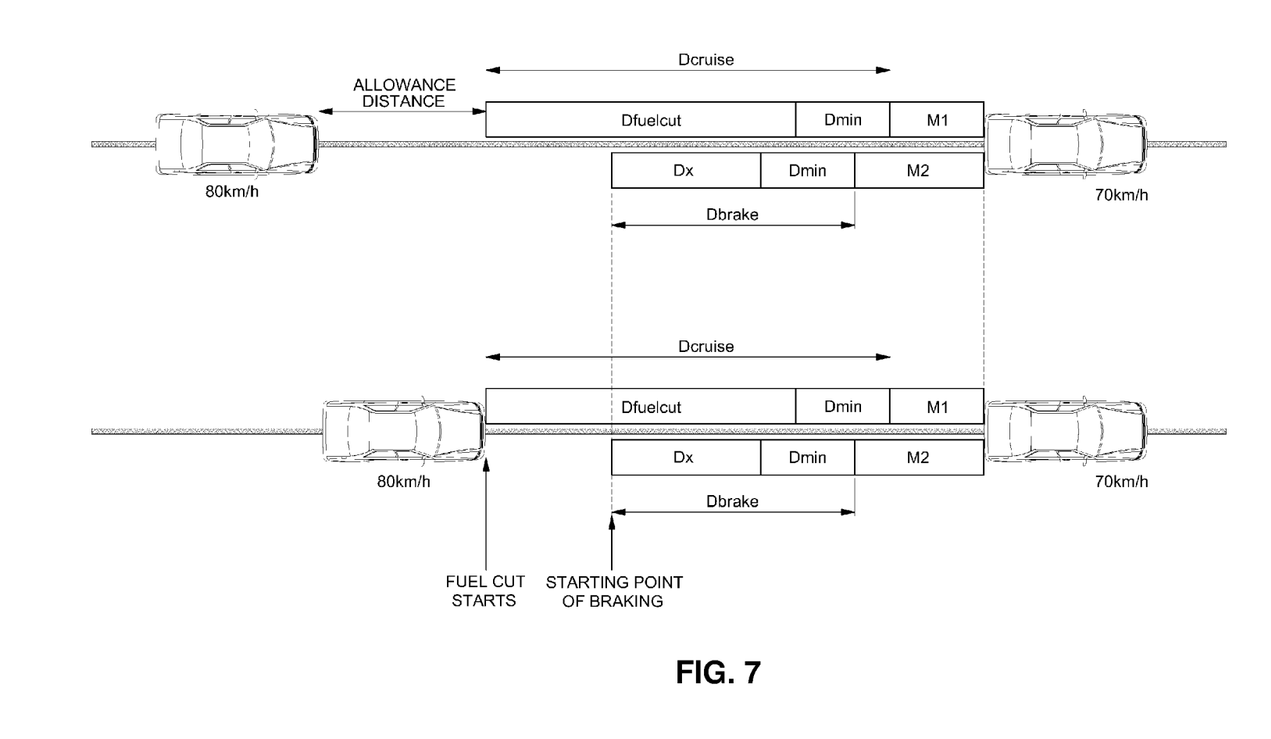
FIG. 7 illustrates a comparison of required distances through an auxiliary decelerator and a brake according to an exemplary embodiment of the present disclosure.

FIG. 7 illustrates a distance relationship among Dcruise, Dbrake, M1, and M2.

That is, in the exemplary embodiment of the present disclosure, Dcruise acquired by aggregating $D_{fuelcut}$ which is a distance to perform the fuel cut and the minimum distance Dmin value set in the adaptive cruise control system is disclosed and a start time to perform the fuel cut as the auxiliary deceleration means is disclosed.

Moreover, time to perform braking within the deceleration range set in the adaptive cruise control system is disclosed, therefore, Dbrake including Dx which is a distance required for deceleration up to the Vtarget value according to the braking force and Dmin set as the minimum distance in the adaptive cruise control system is illustrated.

M1 as the distance margin when the deceleration is performed depending on the auxiliary deceleration means may be set by the user by considering the error of the velocity and the distance measurement error from the preceding vehicle and M2 as the distance margin during performing braking is a value to correspond to an error in measurement and setting.

As illustrated in FIG. 7, Dfuelcut physically has a larger value than Dx and Dmin and Dcruise is also configured to have a larger value than Dbrake.

Figure 8:
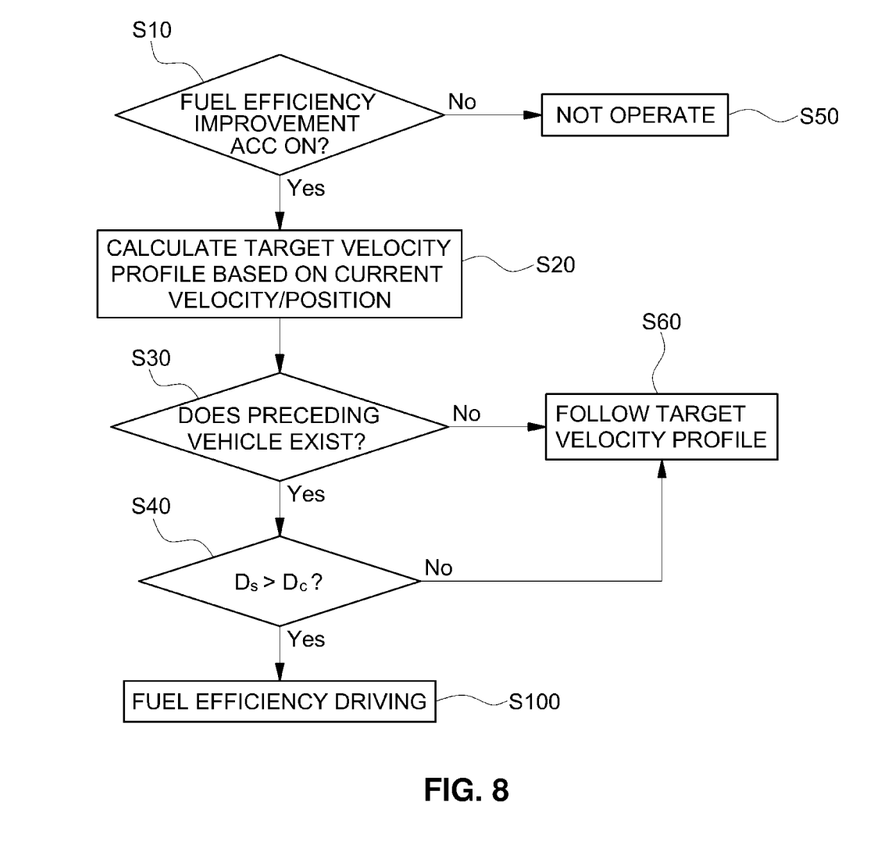
FIG. 8 illustrates a flowchart of steps to control driving of a vehicle when a preceding vehicle exists according to an exemplary embodiment of the present disclosure.

FIG. 8 illustrates a flowchart of a control method for improving fuel efficiency in an adaptive cruise control system when a preceding vehicle exists according to an exemplary embodiment of the present disclosure.

In the adaptive cruise control system of the present disclosure, an operation of the adaptive cruise control system for fuel efficiency improvement is determined (S10), and therefore, when the adaptive cruise control system does not operate, logic ends (S50), and when the adaptive cruise control system operates, a target velocity profile is set based on the current velocity and the position of the vehicle (S20). The target velocity profile is set based on an input velocity set by the user by considering a gradient curvature and slope rate of a road, which are stored in the controller based on path information input by the user.

As described above, when the target velocity profile is set, it is determined whether a preceding vehicle exists (S30). When the preceding vehicle does not exist, driving to follow the set target velocity profile is maintained (S60) and when the preceding vehicle exists, Dc which is an inter-vehicle distance between the preceding vehicle and the corresponding vehicle and Ds which is a minimum distance for preventing a collision with the preceding vehicle in the case of following the target velocity profile are compared with each other (S40).

When the preceding vehicle exists, in the case where Dc which is the inter-vehicle distance between the preceding vehicle and the corresponding vehicle is larger than Ds which is the minimum distance for preventing the collision with the preceding vehicle in the case of following the target velocity profile, the driving is performed according to the target velocity profile (S60) and when Dc which is the inter-vehicle distance between the preceding vehicle and the corresponding vehicle follows the target velocity profile, in the case where Dc is smaller than Ds which is the safety inter-vehicle distance for preventing the collision with the preceding vehicle, determination for fuel efficiency driving is performed (S100).

In order to perform the fuel efficiency driving, velocity following for improving fuel efficiency is performed by considering Cc as cost in the case of performing driving while maintaining the current velocity, Ccontrol as driving cost in the case of following a new target velocity profile when Ds is secured after deceleration, the velocity of the preceding vehicle, a current velocity of the vehicle, a lowest driving velocity set in the vehicle, a distance required to reach a Vtarget value which is a velocity of the preceding vehicle without canceling a fuel efficiency improvement adaptive cruise control system through an auxiliary deceleration means (a fuel cut, and the like), and a deceleration distance.

Figure 9:
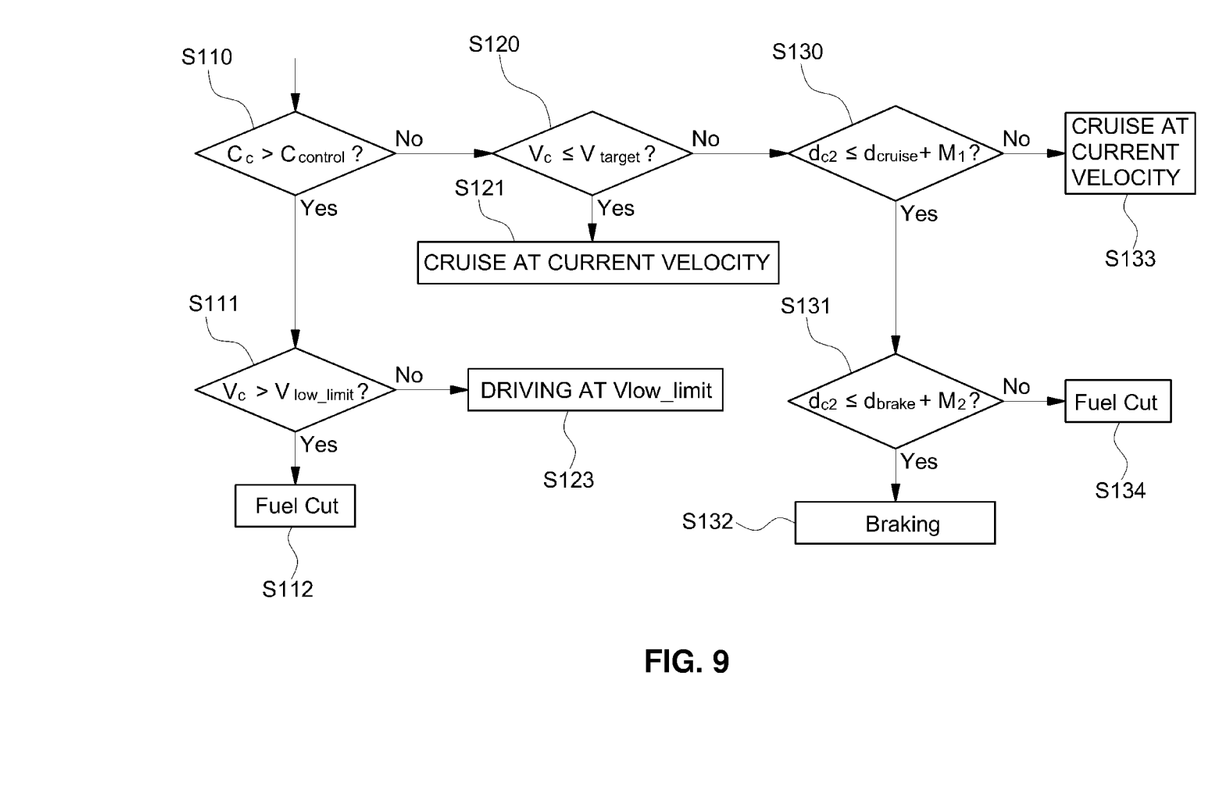
FIG. 9 is a flowchart of control steps for performing fuel efficiency driving according to an exemplary embodiment of the present disclosure.

FIG. 9 illustrates a flowchart for performing fuel efficiency driving according to an exemplary embodiment of the present disclosure.

In order to perform the fuel efficiency driving, Cc that is cost in the case of performing driving while maintaining the current velocity and Ccontrol which is driving cost in the case of following a new target velocity profile when Ds is secured after deceleration are compared with each other (S110).

When Cc as cost in the case of performing driving while maintaining the current velocity is larger than Ccontrol which is the driving cost in the case of following a new target velocity profile when Ds is secured after deceleration in the above step, the current velocity of the vehicle and Vlow_limit set in the adaptive cruise control system are compared with each other (S111).

As described above, when the current velocity of the vehicle is larger than Vlow_limit, the auxiliary deceleration means (the fuel cut, and the like) is controlled to be performed (S112) and when the current velocity of the vehicle is smaller than Vlow_limit, the vehicle is controlled to be driven by maintaining Vlow_limit (S123).

On the other hand, when Cc as cost in the case of performing the driving while maintaining the current velocity is smaller than Ccontrol which is the driving cost in the case of following the new target velocity profile when Ds is secured after deceleration, the current velocity of the vehicle and the velocity of the preceding vehicle are compared with each other (S120). When the current velocity of the vehicle is smaller than the velocity of the preceding vehicle, the vehicle is driven by maintaining the current velocity (S121).

When the current velocity of the vehicle is equal to or larger than the velocity of the preceding vehicle, Dc2 which is a distance between the current corresponding vehicle and the preceding vehicle is compared with a sum of Dcruise which is the distance required to reach the Vtarget value which is the velocity of the preceding vehicle without canceling the fuel efficiency improvement adaptive cruise control system through the auxiliary deceleration means (the fuel cut, and the like) and a distance margin M1 for determining a time to perform the auxiliary deceleration means (the fuel cut, and the like) (S130). When Dc2 which is the distance between the current corresponding vehicle and the preceding vehicle is larger than the sum of Dcruise and the distance margin M1 to determine the time to perform the auxiliary deceleration means (the fuel cut, and the like), the current velocity is set to be maintained (S133) and when Dc2 which is the distance between the current corresponding vehicle and the preceding vehicle is equal to or smaller than the sum of Dcruise and the distance margin M1 to determine the time to perform the auxiliary deceleration means (the fuel cut, and the like), Dc2 which is a distance between the current corresponding vehicle and the preceding vehicle is compared with an aggregation of Dbrake and a distance margin M2 to determine a braking time (S131).

When Dc2 which is a distance between the current corresponding vehicle and the preceding vehicle is equal to or smaller than the sum of Dbrake and the distance margin M2, braking the vehicle is performed (S132) and when Dc2 which is a distance between the current corresponding vehicle and the preceding vehicle is larger than the sum of Dbrake and the distance margin M2 to determine the braking time, deceleration is performed through the auxiliary deceleration means (the fuel cut, and the like) (S134).

As described above, according to the present disclosure, the vehicle is controlled so as to follow an optimal fuel efficiency driving profile or velocity by applying the logic every moment, thereby controlling the vehicle in order to improve the fuel efficiency even in a traffic situation in which vehicular traffic is frequent.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A control method for improving fuel efficiency in an adaptive cruise control system when a preceding vehicle exists, the method comprising steps of:
   setting, by a controller, a target velocity profile based on a current velocity and a current position of a following vehicle when the following vehicle is driven by the adaptive cruise control system;
   determining, by the controller, whether the preceding vehicle exists while driving the following vehicle under the target velocity profile;
   comparing, by the controller, a minimum distance for preventing a collision between the preceding vehicle and the following vehicle in a case of applying the target velocity profile with a first distance which is a distance between the preceding vehicle and the following vehicle when the preceding vehicle exists; and performing, by the controller, fuel efficiency driving of the following vehicle when the minimum distance is larger than the first distance and performing driving of the following vehicle according to the target velocity profile when the minimum distance is smaller than the first distance, wherein the fuel efficiency driving is set by considering a first driving cost for maintaining the current velocity of the following vehicle, a second driving cost in a case of applying a new target velocity profile when the minimum distance is secured after deceleration, a velocity of the preceding vehicle, the current velocity of the following vehicle, a lowest driving velocity set in the following vehicle, a distance required to reach a current velocity of the preceding vehicle while maintaining the fuel efficiency driving, and a deceleration distance.

2. The method of claim 1, wherein the step of performing of the fuel efficiency driving includes:

comparing the first driving cost with the second driving cost;

maintaining, when the first driving cost is smaller than the second driving cost, constant-velocity driving at the current velocity of the following vehicle or performing the deceleration by comparing the current velocity of the following vehicle with the current velocity of the preceding vehicle;

comparing, when the first driving cost is larger than the second driving cost, the current velocity of the following vehicle with a minimum velocity set in the following vehicle; and performing, when the current velocity of the following vehicle is larger than the minimum velocity set in the following vehicle, driving through an auxiliary decelerator and performing, when the current velocity of the following vehicle is smaller than the minimum velocity set in the following vehicle, driving at the minimum velocity set in the following vehicle.

3. The method of claim 2, wherein the step of comparing the current velocity of the following vehicle and the current velocity of the preceding vehicle includes:

performing, when the current velocity of the following vehicle is larger than the current velocity of the preceding vehicle, the constant-velocity driving at the current velocity of the following vehicle; and comparing, when the current velocity of the following vehicle is smaller than the current velocity of the preceding vehicle, a current distance between the following vehicle and the preceding vehicle with a sum of a second distance, which is required to reach the velocity of the preceding vehicle while maintaining the fuel efficiency driving through the auxiliary decelerator, and a first distance margin which depends on the auxiliary decelerator.

4. The method of claim 3, wherein the step of comparing the current distance with the sum of the second distance and the first distance margin includes:

performing, when the current distance is larger than the sum of the second distance and the first distance margin, the constant-vehicle driving at the current velocity of the following vehicle; and comparing, when the current distance is smaller than the sum of the second distance and the first distance margin, the current distance with a sum of a third distance which is required to reach the current velocity of the preceding vehicle by performing braking and a second distance margin through braking.

5. The method of claim 4, wherein in the step of comparing the current distance with the sum of the third distance and the second distance margin, when the current distance is larger than the sum of the third distance and the second distance margin, deceleration is performed through the auxiliary decelerator of the following vehicle and when the current distance is smaller than the sum of the third distance and the second distance margin, deceleration is performed through the braking of the vehicle.

6. The method of claim 1, wherein in the step of setting the target velocity profile, the target velocity profile is set by considering road information on a driving path of the following vehicle.

7. The method of claim 6, wherein the road information includes a curvature, a gradient, and a rotational radius of a road.

8. A non-transitory computer readable medium comprising computer executable instructions execution of which causes the controller to perform the control method of claim 1.

* * * * *